Aug. 28, 1934.  R. J. BRITTAIN, JR., ET AL  1,971,946
JOURNAL BOX CONSTRUCTION
Filed Oct. 12, 1929   2 Sheets-Sheet 2
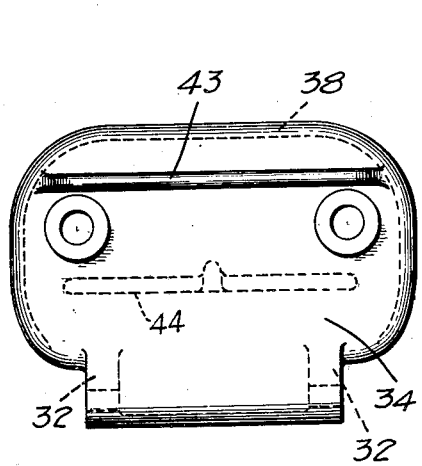
Fig_4_
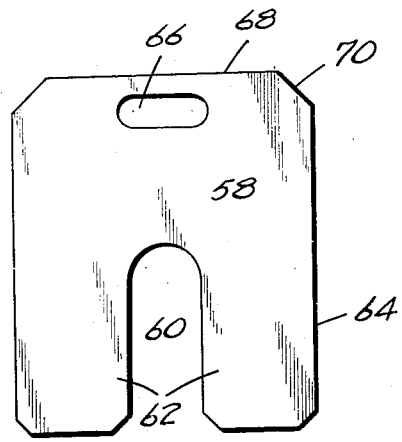
Fig_5_
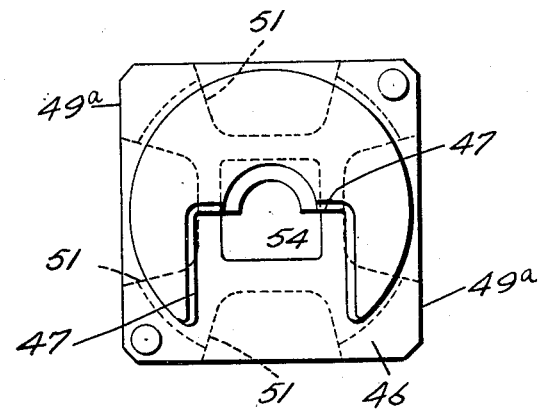
Fig_6_
INVENTORS:
HAROLD R. GIBBONS.
RICHARD J. BRITTAIN, JR.
BY
THEIR ATTORNEY.

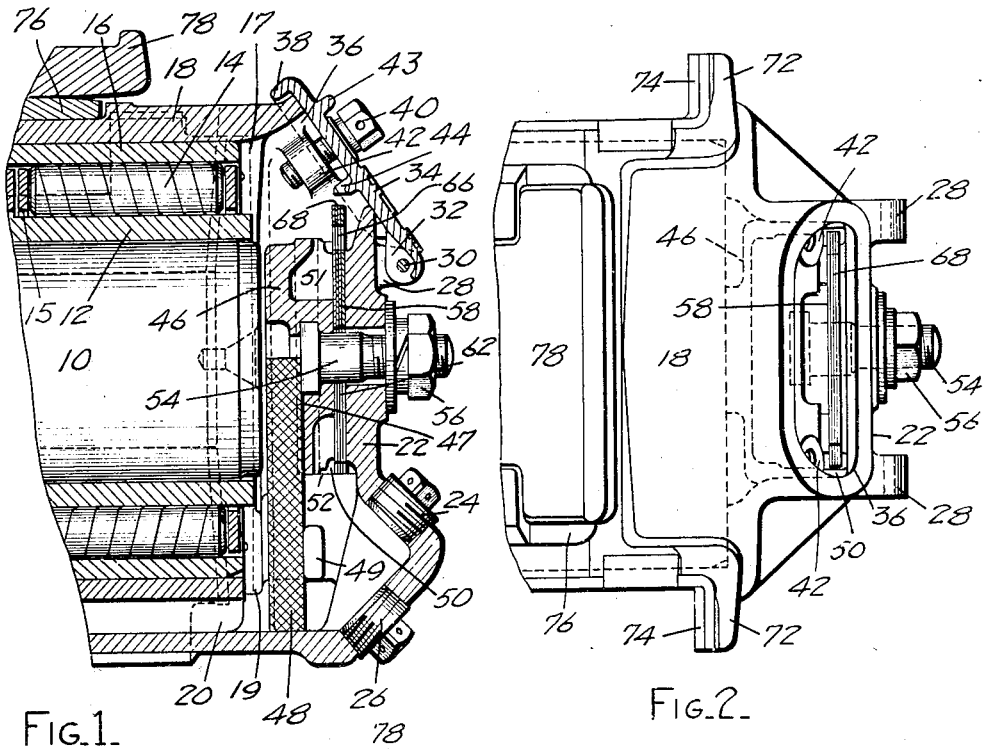
Fig. 1.
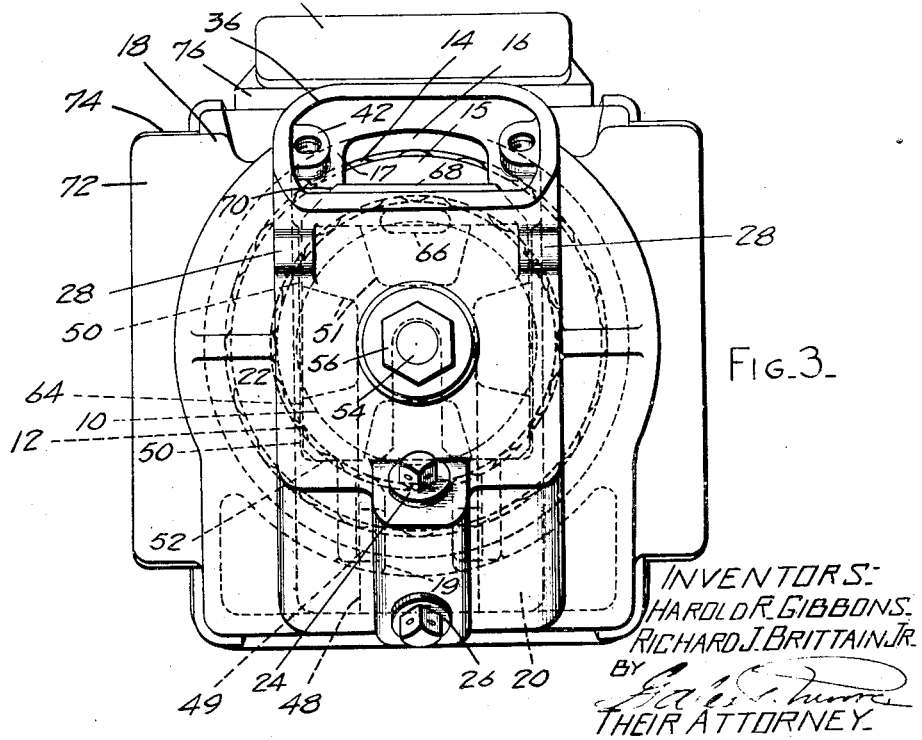
Fig. 2.
Fig. 3.
INVENTORS:
HAROLD R. GIBBONS.
RICHARD J. BRITTAIN JR.
BY
THEIR ATTORNEY.

Patented Aug. 28, 1934

1,971,946

UNITED STATES PATENT OFFICE 1,971,946

JOURNAL BOX CONSTRUCTION

Richard J. Brittain, Jr., Bloomfield, and Harold R. Gibbons, Chatham, N. J., assignors to General Motors Corporation, Detroit, Mich., a corporation of Delaware Application October 12, 1929, Serial No. 399,354

15 Claims. (Cl. 308—41)

This invention relates to journal box construction and comprises all the features of novelty herein disclosed. An object of the invention is to provide an improved journal box wherein bearings and thrust devices are easy to assemble and inspect. Another object is to provide adjustable end thrust devices of improved construction. Another object is to provide an improved roller bearing journal box having a closed end wall. To these ends and to improve generally and in detail upon devices of this character, the invention also consists in the various matters hereinafter described and claimed.

In its broader aspects, the invention is not necessarily limited to the specific construction selected for illustrative purposes in the accompanying drawings in which Fig. 1 is a vertical central section of the outer portion of a car axle box.

Fig. 2 is a plan view with lid removed.

Fig. 3 is an end view with lid removed.

Fig. 4 is a plan view of the lid.

Fig. 5 is a detail view of a spacing plate and

Fig. 6 is a detail view of the thrust block.

The numeral 10 indicates a shaft or axle with a raceway sleeve 12 carrying roller bearings 14 having end rings 15. The rollers run on an outer race sleeve 16 abutting at its outer end against arcuate ribs 17 projecting inwardly from the bore of a journal box 18, the ribs being separated at the top to permit inspection of the bearings and to let oil from the bearings run down across the end of the axle. The arcuate ribs are also separated at the bottom as indicated at 19 to provide a passage communicating with a cored-out lubricant reservoir 20 at the bottom of the box. The outer end of the box has an end wall 22 connecting the side walls of the box and provided with removable screw plugs 24 and 26 for filling and draining the lubricant reservoir.

The end wall 22 has a pair of spaced lugs 28 holding a hinge pin 30 which passes through an extension 32 on a hinged lid 34 which closes an opening 36 at the top of the box. The lid has an overhanging bead or flange 38 surrounding the opening to shed water and is secured in closed position by threaded studs 40 entering tapped openings in lugs 42 inside the box. The lid also carries a flange 43 to shed water from the studs and has an inwardly projecting holding lug 44 for a purpose which will appear.

The end of the axle is opposed by a thrust block 46 having a notch 47 for a lubricating wick 48 extending down to the lubricant reservoir where its outer side engages projecting lugs 49 on the box opposite the space 19 above mentioned. Thus, oil raised by the wick to the axle end can drop directly back into the reservoir. The thrust block 46 has flattened side walls 49ª which fit between flat opposed walls 50 inside the box, portions of the block being cut out as indicated at 51 to save material. A flat bottom wall on the block rests on spaced flat shelves 52 in the box. The thrust block is preferably made of bronze cast around a square headed stud 54 which is threaded to receive a clamping nut 56 outside the box.

Between the thrust block and a flattened face of the end wall are clamped a series of spacing plates 58 of such selected aggregate thickness as to provide the desired lateral play between the block and the end of the axle. Each spacing plate has a slot 60 providing opposite legs 62 to straddle the stud 54. The plates are insertable endwise through the opening 36 in the box and have straight side walls 64 fitting between the flat walls 50 of the box, while the bottom wall at the ends of the legs rests on the shelves 52. Each plate has an opening 66 providing a hand hold and the top wall 68 is straight and connected to the side walls by bevelled portions 70. The lug 44 on the lid 34 is arranged to overly the top walls 68 of the plates to hold the plates from working upwardly. Thus the spacing plates can be inserted or removed vertically without removing the thrust block from the box or removing the box from the car truck and it is only necessary to loosen the clamping nut 56, remove screw 40, and turn back the hinged lid. The opening 36 in the box is in the plane of the spacing plates and is so located on an incline that it also provides for easy visual inspection of the interior surfaces and parts, the space between the arcuate ribs 17 contributing to this ease of inspection. Thus the bearings can be inspected as well as play between the axle end and thrust block. All lateral shock is absorbed by a single casting provided by the box and its integral end wall. The box has the crowned pedestal flanges 72 covered by wear plates 74 having their ends bent over and welded to the box. The top of the box has a central recess supporting a block 76 which is crowned to support a rocker plate 78 on which the usual equalizer rests.

We claim:

1. In a device of the character described, a journal box having an end wall rigidly connecting its opposite side walls and provided with a flattened face, a shaft journalled in the box and having its end opposite to said flattened face, a thrust block to engage the end of the shaft, flat spacing plates between the thrust block and the flattened face of said end wall, and the box having an opening over the spacing plates for endwise removal of the spacing plates; substantially as described.

2. In a device of the character described, a journal box having an end wall connecting the side walls and provided with a flattened face, a shaft journalled in the box, a thrust block to engage the end of the shaft, a stud for securing the thrust block to the end wall of the box, and spacing plates between the thrust block and the flattened face of the end wall of the box, the spacing plates being slotted to removably straddle the stud; substantially as described.

3. In a device of the character described, a journal box having an end wall connecting the side walls and provided with a flattened face, a shaft journalled in the box and having its end opposite to and spaced from the flattened face, a thrust block to engage the end of the shaft, a stud for securing the thrust block to the end wall of the box, spacing plates between the thrust block and the flattened face of the end wall of the box, the spacing plates being slotted to removably straddle the stud, and the box having an opening in the plane of the spacing plates; substantially as described.

4. In a device of the character described, a journal box, a shaft journalled in the box, the box having an end wall provided with a flattened face opposite to the end of the shaft, a thrust block to engage the end of the shaft, a stud for securing the thrust block to the end wall of the box, spacing plates between the thrust block and the flattened face of said end wall, the spacing plates being slotted to straddle the stud and having openings, and the box having an opening in line with said flattened face for removal of the spacing plates from the stud; substantially as described.

5. In a device of the character described, a journal box, a shaft journalled in the box, a thrust block to engage the end of the shaft, a stud for securing the thrust block to the end wall of the box, spacing plates between the thrust block and the end wall of the box, the spacing plates slotted to straddle the stud and having openings to facilitate their removal from the stud, and the box having a lid with means to retain the spacing plates; substantially as described.

6. In a device of the character described, a journal box having an end wall connecting the side walls and provided with a flattened face, a shaft journalled in the box and having its end opposite to said flattened face, a thrust block to engage the end of the shaft, spacing plates between the thrust block and the flattened face, the spacing plates having straight side walls, and the box having opposed walls embracing and slidably receiving the side walls of the spacing plates; substantially as described.

7. In a device of the character described, a journal box having an end wall connecting its side walls, a shaft journalled in the box, a thrust block to engage the end of the shaft, a stud for securing the thrust block to the end wall of the box, spacing plates between the thrust block and the end wall of the box, the spacing plates having straight side walls, the interior of the box having opposed walls embracing said straight side walls, and the box having a lid covering an opening in the plane of the spacing plates and the spacing plates being removable endwise through the opening; substantially as described.

8. In a device of the character described, a journal box having a closed end wall connecting the side walls and provided with a flattened face, a shaft journalled in the box and having its end opposite to said flattened face, a thrust block to engage the end of the shaft, spacing plates between the thrust block and the flattened face of the end wall, the thrust block having straight side walls and a bottom wall, the end wall having a shelf below the flattened face to engage the bottom wall of the thrust block, and the box having opposed walls embracing the side walls of the block with an opening in the plane of the spacing plates; substantially as described.

9. In a device of the character described, a journal box having a closed end wall connecting the side walls and provided with a flattened face, a shaft journalled in the box and having its end opposed to said flattened face, a thrust block to engage the end of the shaft, spacing plates between the thrust block and the flattened face of the end wall, the end wall having spaced shelves below the flattened face, and the spacing plates having legs resting on said shelves; substantially as described.

10. In a device of the character described, a journal box, a shaft journalled in bearings in the box, the box having an end wall connecting the side walls and provided with an opening at the top, a thrust block opposing the end of the shaft, a stud for securing the thrust block to the end wall, spacing plates between the thrust block and the end wall of the box, the spacing plates having a passage for the stud and being disengageable therefrom, for endwise removing through the opening, the opening exposing a portion of the thrust block, spacing plates, and bearings, and a lid covering the opening; substantially as described.

11. In a device of the character described, a journal box, a shaft, bearings between the shaft and box, the box having inwardly projecting arcuate ribs at the outer end of the bearings, the ribs being separated to expose the bearings, and the box having a lid covering an opening arranged opposite to the space between the ribs; substantially as described.

12. In a device of the character described, a journal box, a shaft, bearings between the shaft and box, the box having inwardly projecting arcuate ribs at the outer end of the bearings, the ribs being separated above and below the shaft, a thrust block opposing the end of the shaft, a wick leading from the bottom of the box to the thrust block and arranged opposite to the lower space between the ribs, and the box having a lid covering an opening opposite to the upper space between the ribs; substantially as described.

13. In a device of the character described, a journal box having a lubricant reservoir, a shaft, bearings between the shaft and box, the box having inwardly projecting arcuate ribs at the outer end of the bearings, the ribs being separated above and below the shaft to furnish communication between the bearings and the lubricant reservoir, and a thrust block carried by the end wall of the box beyond the end of the shaft; substantially as described.

14. In a device of the character described, a journal box having side walls and an end wall rigidly connecting the side walls, a shaft extending into the box, bearings between the shaft and the box, a thrust block opposing the end of the shaft, flat spacing plates interposed between the thrust block and the end wall, the box having a support for the spacing plates and having an opening over the end wall to provide for free endwise removal of the spacing plates, and a lid covering the opening and having a part overlying the spacing plates to retain the latter; substantially as described.

15. In a device of the character described, a journal box having a rigid end wall integrally connecting its side walls, a shaft journalled in the box, a thrust block spaced from the end of the shaft, means for securing the thrust block to the end wall, and means insertable between the thrust block and the end wall to adjust the space between the thrust block and the shaft without removing the thrust block or its securing means; substantially as described.

HAROLD R. GIBBONS.
RICHARD J. BRITTAIN, JR.